(12) United States Patent
Eck et al.

(10) Patent No.: US 10,184,974 B2
(45) Date of Patent: Jan. 22, 2019

(54) SYSTEMS AND METHODS FOR DETERMINING WHETHER A CIRCUIT IS OPERATING PROPERLY

(71) Applicant: Raytheon Company, Waltham, MA (US)

(72) Inventors: Christopher R. Eck, Dunedin, FL (US); Linda A. Gee, Danville, NH (US); John A. Cogliandro, Dedham, MA (US)

(73) Assignee: Raytheon Company, Waltham, MA (US)

( * ) Notice: Subject to any disclaimer, the term of this patent is extended or adjusted under 35 U.S.C. 154(b) by 328 days.

(21) Appl. No.: 14/861,214

(22) Filed: Sep. 22, 2015

(65) Prior Publication Data

US 2017/0082680 A1 Mar. 23, 2017

(51) Int. Cl.
*G01R 31/00* (2006.01)
*G01R 31/28* (2006.01)
(Continued)

(52) U.S. Cl.
CPC ..... *G01R 31/2815* (2013.01); *G01R 31/2817* (2013.01); *G06F 11/00* (2013.01);
(Continued)

(58) Field of Classification Search
CPC . G01R 31/2815; G01R 31/2817; G06F 11/00; G06F 21/552; G06F 21/554; G06F 2/5661; H04L 63/1441
(Continued)

(56) References Cited

U.S. PATENT DOCUMENTS 4,812,995 A 3/1989 Girgis et al.
5,323,462 A * 6/1994 Farmer ................. H04K 3/41
348/E7.065

(Continued)

FOREIGN PATENT DOCUMENTS

WO WO-2017052730 A1 3/2017

OTHER PUBLICATIONS

"U.S. Appl. No. 14/279,869 Response filed Jan. 28, 2016 to Non-Final Office Action dated Oct. 2, 2015", 13 pgs.
"U.S. Appl. No. 14/279,869, Examiner Interview Summary dated Jan. 25, 2016", 3 pgs.
"U.S. Appl. No. 14/279,869, Notice of Allowance dated Feb. 19, 2016", 4 pgs.
"International Application Serial No, PCT/US2016/042842, International Search Report dated Oct. 10, 2016", 5 pgs.
(Continued)

*Primary Examiner* — Tan T. Nguyen
(74) *Attorney, Agent, or Firm* — Schwegman Lundberg & Woessner, P.A.

(57) ABSTRACT

Generally discussed herein are systems, devices, and methods for determining if a circuit is acting improperly. A system can include a module to receive proper performance values of a circuit, a module to receive improper performance values of the circuit, a module to compare actual circuit input characteristics ($X_a$) and actual circuit output characteristics ($Y_a$) to X, Y, D, and Z to determine if the circuit is more likely operating properly or more likely operating improperly, and an alert module to, in response to determining the circuit is operating improperly, provide an alert to personnel indicating that the circuit is operating improperly or providing one or more signals to the circuit that cause the circuit to alter its current operation.

15 Claims, 3 Drawing Sheets

(51) Int. Cl.
*G06F 11/00* (2006.01)
*G06F 21/55* (2013.01)
*G06F 21/56* (2013.01)
*H04L 29/06* (2006.01)

(52) U.S. Cl.
CPC .......... *G06F 21/552* (2013.01); *G06F 21/554* (2013.01); *G06F 21/566* (2013.01); *H04L 63/1441* (2013.01); *H04L 63/1491* (2013.01); *G06F 2221/2127* (2013.01)

(58) Field of Classification Search
USPC .................. 702/120, 117, 182, 185, 186
See application file for complete search history.

(56) References Cited

U.S. PATENT DOCUMENTS

| | | | |
|---|---|---|---|
| 6,535,227 | B1 | 3/2003 | Fox et al. |
| 7,421,371 | B2* | 9/2008 | Segers ................ G06F 11/0733 702/183 |
| 8,023,651 | B2* | 9/2011 | Gorissen ................ H04L 9/002 380/200 |
| 8,103,463 | B2* | 1/2012 | Kalgren ................ G01D 3/08 702/117 |
| 8,490,193 | B2 | 7/2013 | Sarraute et al. |
| 8,490,196 | B2 | 7/2013 | Lucangeli et al. |
| 8,515,881 | B2 | 8/2013 | Schwoegler et al. |
| 8,601,587 | B1 | 12/2013 | Powell et al. |
| 8,923,186 | B1* | 12/2014 | daCosta ................ H04W 4/70 370/312 |
| 9,299,042 | B2 | 3/2016 | Eck |
| 9,367,694 | B2 | 6/2016 | Eck et al. |
| 2004/0002776 | A1 | 1/2004 | Bickford |
| 2004/0172557 | A1* | 9/2004 | Nakae ................ H04L 63/0227 726/22 |
| 2005/0084101 | A1* | 4/2005 | Tanner, Jr. .............. G06F 21/10 380/201 |
| 2008/0027890 | A1 | 1/2008 | Chickering et al. |
| 2008/0144835 | A1 | 6/2008 | Roy et al. |
| 2012/0036093 | A1 | 2/2012 | Gleason |
| 2012/0185728 | A1* | 7/2012 | Guo .................... F24F 11/0009 714/26 |
| 2012/0233698 | A1 | 9/2012 | Watters et al. |
| 2012/0245449 | A1 | 9/2012 | Williams et al. |
| 2013/0060524 | A1* | 3/2013 | Liao ................... G05B 23/0254 702/184 |
| 2013/0246020 | A1 | 9/2013 | Zeng |
| 2014/0108994 | A1 | 4/2014 | Medlock et al. |
| 2014/0317033 | A1 | 10/2014 | Mojsilovic et al. |
| 2014/0317038 | A1 | 10/2014 | Mojsilovic et al. |
| 2015/0046384 | A1 | 2/2015 | Eck |
| 2015/0208233 | A1* | 7/2015 | Rui ........................ G06F 21/83 726/26 |
| 2015/0332054 | A1 | 11/2015 | Eck et al. |

OTHER PUBLICATIONS

"International Application Serial No. PCT/US2016/042842, Written Opinion dated Oct. 10, 2016", 8 pgs.

Tesar, et al., "A toolbox for model-based fault detection and isolation", European Control Conference (ECC) Karlsruhe,Germany, Ieee, Piscataway, Nj, Usa, [retrieved on Apr. 30, 2015], (Aug. 31, 1999), 4149-4154.

W, Bandler, et al., "A New Look at the Magill Adaptive Filter as a Practical Means of Multiple Hypothesis Testing", IEEE Truns. Circuits Syst. IEEE Trans.Circuit Theory Electron. L.,&t. T. N. Trick. E. I. El-Masrv. A. A. Sakla, and B.L. Inn Semikductor Test Conf. Dig, [Online] Retrieved from the internet: URL: http ://ieeexplore.i eee.org/i elX5/31/23 538/01085288.pdf?tp=&arnumber= 1085288&i snumber=23538, (Jan. 1, 1981), 256-260.

"U.S. Appl. No. 13/963,439, Notice of Allowance dated Nov. 18, 2015", 5 pgs.

"U.S. Appl. No. 14/279,869, Non Final Office Action dated Oct. 2, 2015", 18 pgs.

"U.S. Appl. No. 13/963,439, Response filed Oct. 22, 2015 to Non-Final Office Action dated Jul. 23, 2015", 7 pgs.

"U.S. Appl. No. 13/963,439, Non Final Office Action dated Jul. 23, 2015", 11 pgs.

Berlingerio, Michele, et al., "Mining Graph Evolution Rules", ECML PKDD '09 of the European Conference on Machine Learning and Knowledge Discovery in Databases: Part I, (2009), 16 pgs.

Cheng, et al., "Prediction of Drug-Target Interactions and Drug Repositioning viaNetwork-Based Inference", (2012).

Conway, Drew, "Modeling Network Using Graph Motifs", Arxiv preprint arXiv:1105.0902, (May 5, 2011), 1-33.

Eck, Charles, "Predicting Edges in Temporal Network Graphs Described by Near-Bipartite Data Sets", U.S. Appl. No. 13/963,439, filed Aug. 9, 2013, 40 pgs.

Faloutsos, Michalis, et al., "On Power-Law Relationships of the Internet Topology", Proceedings of the Conference on Applications, Technologies, Architectures, and Protocols for Computer Communication (SIGCOMM '99), (1999), 12 pgs.

Mankoff, et al., "Providing Integrated Toolkit-Level Support for Ambiguity in Recognition-Based Interfaces", (2000).

Schwoegler, S., et al., "On the Application of Multiple Hypothesis Tracking to the Cyber Domain", 14th International Conference on Information Fusion (Chicago, Illinois, Jul. 5-8, 2011), (2011), 247-252.

Snijders, Tom A. B., et al., "Maximum Likelihood Estimation for Social Network Dynamics", The Annuals of Applied Statistics, 4(2), (2010), 567-588.

Xu, Jennifer, "The Topology of Dark Networks", Communications of the ACM, 51(10), (Oct. 2008), 58-86.

"International Application Serial No. PCT/US2016/042842, International Preliminary Report on Patentability dated Apr. 5, 2018", 9 pgs.

* cited by examiner

SYSTEMS AND METHODS FOR DETERMINING WHETHER A CIRCUIT IS OPERATING PROPERLY

TECHNICAL FIELD

Embodiments discussed herein generally relate to determining if tampering or a failure has occurred on an electronic circuit or the operation of the circuit has been otherwise compromised. One or more embodiments relate more specifically to using observed evidence and prediction to probabilistically determine if tampering or other malicious behavior has adversely affected one or more components of a circuit.

BACKGROUND

Finding tampering or a component failure on circuit boards (hardware or firmware) is currently a time consuming and highly manual process that is often subjective. The existing process is also very difficult to apply to a product in use. A circuit component is typically known to be acting in a non-conforming manner through manual analysis of circuit outputs based on circuit inputs. Such an analysis is sometimes referred to as a differential power analysis (DPA). A DPA can take many tens of hours of manual laboratory measurements to determine the condition of a circuit, system, or component followed by analysis of the measurement data. Such an analysis requires specially trained person(s) performing the analysis using, often complex, test hardware to have detailed knowledge of the proper operation of the circuit and the circuit components, such as the appropriate power consumption for a given set of operations. Such an analysis can also be prohibitively time consuming without a guarantee that the analysis will reveal useful information, and the information provided may not be available in the time or location needed.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to determining if one or more components of a circuit (e.g., a sub system, system, or system of systems) have been compromised, wither maliciously or via failure of one or more components, or are behaving in an unexpected or compromised manner. Subject matter discussed herein provides means for analyzing circuit components and determining, probabilistically, whether the circuit components have been compromised or are otherwise behaving in an unexpected or compromised manner.

Discussed herein is subject matter that utilizes a combination of observed evidence with prediction to probabilistically determine tampering or malicious behavior in circuit boards. The subject matter classifies stimulated output of circuit boards as normal or abnormal to identify proper and improper performance parameters. Differential power analysis (DPA) in combination with a comparison of one or more proper parameter maps and improper parameter maps can be used to find abnormal behavior more quickly and in an automated manner than is currently done. Additionally, an intelligent, adaptive alarm that provides Built In Test (BIT) capability can be used to add a capability for user selectivity of the alarm, and the ability to adjust an alarm reaction based on current Concept of Operations (CONOPS) of the circuit and/or component. The alarm can include a variable tolerance (e.g., from no tolerance to an infinite tolerance and any tolerance in between), such as to provide a flexible alarm system that allows for different alarm tolerance levels to be defined at the component and/or circuit level. Using the flexible alarm tolerances, one component can have no tolerance for a change in behavior, that is an alarm will be triggered if any unexpected is detected from the component (i.e. zero tolerance), while another component can fail without triggering an alarm (i.e. infinite tolerance). Any level in between can be realized and specified by a user or automatically specified based on the CONOPS, the type of improper behavior detected (e.g., a software, hardware, or power failure, etc.), and the importance of the component to the CONOPS. Further yet, the subject matter can include the ability to help locate a compromised component on the board, further supplementing the decision framework of the alarm and the recommended alarm state reactions of the system (e.g., critical component compromised=shut down or decoy, noncritical component=continue in substandard operational mode, etc.). The recommendation can be provided to the circuit in the form of instruction signals that cause the circuit to alter its behavior or in the form of instruction signals (text instructions) to personnel indicating one or more actions to be performed by the personnel. The recommendation can be determined based on the type of failure, criticality of the component to the CONOPS, and/or the CONOPS.

Figure 1:
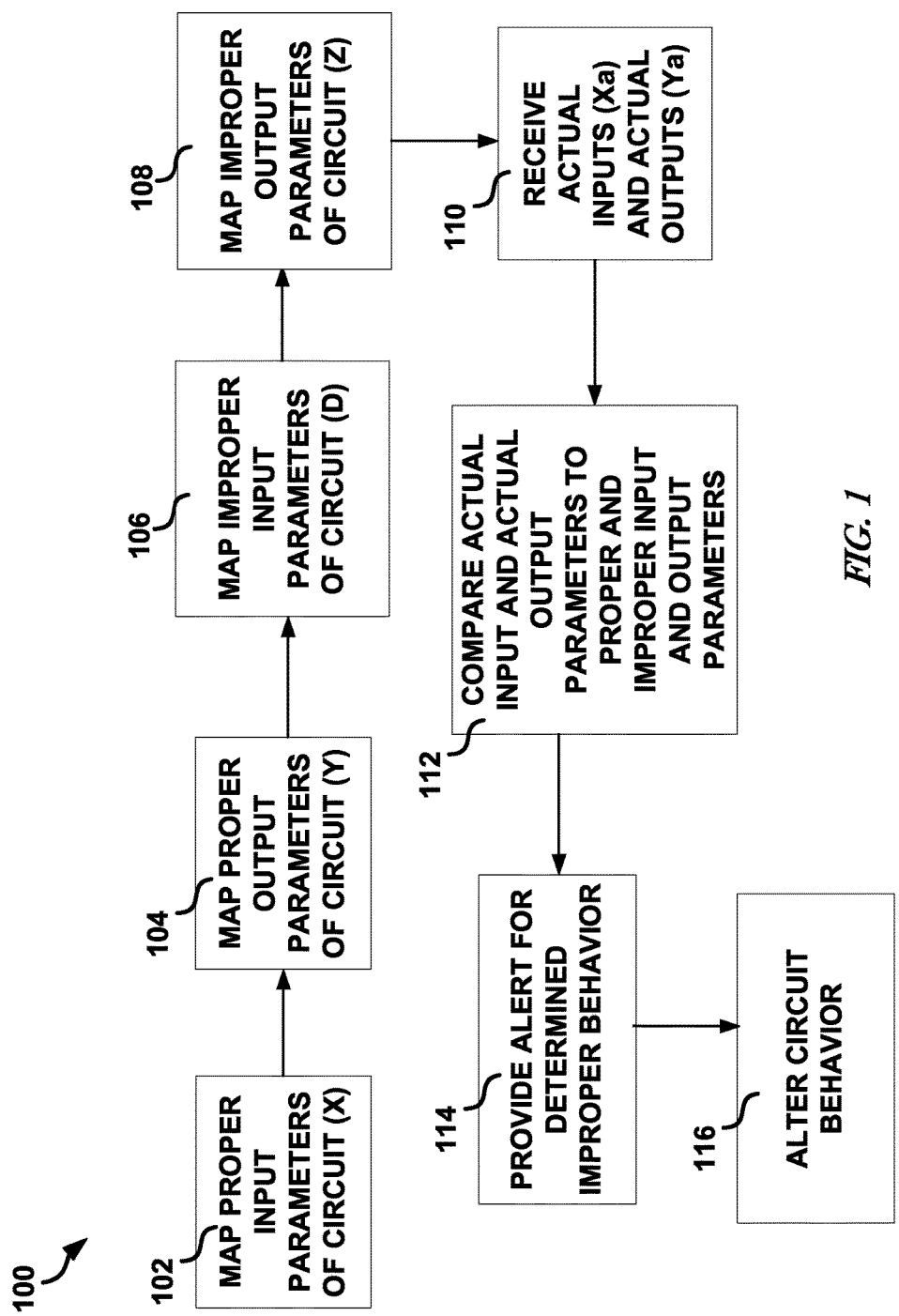
FIG. 1 illustrates, by way of example, a block diagram of an embodiment of a method for determining whether operation of a circuit has been compromised.

FIG. 1 illustrates, by way of example, a block diagram of an embodiment of a method 100 for determining if a circuit (e.g., a component of a plurality of components of the circuit) has been compromised. The operations of the method 100 can be performed manually by a human, automatically (i.e. without human interference after deployment) by a machine, or a combination thereof. The operations do not need to be performed in the order shown in FIG. 1. For example, operations 102, 104, and 106 can be performed in any order so long as they are performed prior to operation 108.

The method 100 as illustrated includes mapping proper input parameters of the circuit at operation 102. The proper input parameters of the circuit are referred to herein as X. The proper input parameters X comprise a plurality of individual proper input parameters $X_1, X_2 \ldots X_N$. Each of the proper input parameters can be determined by experimentation, mining a datasheet corresponding to the component, and/or predicting a proper input. A predicted proper input parameter can be determined by review of data sheets, performing a simulation using electrical or electronic circuit simulation software and/or hardware and using an output of the simulation as a predicted output. Additionally or alternatively, the predicted proper input parameter can be determined using circuit theory (e.g., Kirchhoff's rule, Ohm's law, small and/or large signal analysis, semiconductor device theory, Coulomb's law, etc.). A proper input parameter can be evaluated using a Kalman filter to determine if an input is more likely proper or improper. Additionally or alternatively, a proper input parameter can be gleaned from a data sheet regarding the component or by experimentation in which proper input parameters are applied to a component and the input to another component is measured while the proper input is being applied or it is compared to measurements and analysis from a known good component trial. The proper input parameters can include a voltage or current (e.g., a range of voltages or currents) at an input node of a component. The proper input parameters can include one or more forcing functions that are expected to be applied to the circuit after it is deployed to get the circuit to operate in the field. The forcing function can be determined from a spec sheet or can be within the tolerances of the component. The forcing function is a signal that changes amplitude in a predefined manner over a period of time. The proper input parameters can include an electrical and/or frequency based signal leakage.

The method 100 as illustrated includes mapping proper output parameters of the circuit at operation 104. The proper output parameters of the circuit are referred to herein as Y. The output parameters Y comprise a plurality of individual proper output parameters $Y_1, Y_2 \ldots Y_N$. Each of the proper output parameters can be determined by experimentation, mining a datasheet corresponding to the component, and/or predicting a proper output. A predicted proper output parameter can be determined by performing a simulation using electrical or electronic circuit simulation software and/or hardware and using an output of the simulation as a predicted output. Additionally or alternatively, the predicted proper output parameter can be determined using circuit theory. In one or more embodiments, an improper input parameter can be predicted using a Kalman filter. Additionally or alternatively, a proper output parameter can be gleaned from a data sheet regarding the component or by experimentation in which known proper input parameters are applied to a component and the output that component is measured while the proper input is being applied, such as to produce a "gold" reference standard. The proper output parameters can include one or more of a power consumption of component, a voltage or current (e.g., a range of voltages or currents) on an output node of a component, a heat profile of a component while in normal operation, a signal to noise ratio of the component, a radio frequency (RF) pattern, such as an RF pattern of a signal created by the component or an RF interference pattern of the component. The proper output parameters can include an electrical and/or frequency based signal leakage.

The method 100 as illustrated includes mapping improper input parameters of the circuit at operation 106. The improper input parameters of the circuit are referred to herein as D. The improper input parameters D comprise a plurality of individual improper input parameters $D_1, D_2 \ldots D_N$. Each of the improper input parameters can be determined by experimentation, mining a datasheet corresponding to the component, and/or predicting an improper input. A predicted improper input parameter can be determined by performing a simulation using electrical or electronic circuit simulation software and/or hardware and using an output of the simulation as improper input. Additionally or alternatively, the predicted improper input parameter can be determined using circuit theory. In one or more embodiments, an improper input parameter can be predicted using a Kalman filter. Additionally or alternatively, an improper input parameter can be gleaned from a data sheet regarding the component or by experimentation in which improper input parameters are applied to a component and the input to another component is measured while the improper input is being applied. The improper input parameters can include a voltage, current, power, and/or frequency (e.g., a range of voltages, currents, power, and/or frequencies) at an input node of a component. If the measured or predicted input parameter is not in the proper inputs (X), then the measured or predicted parameter can be added to the improper input parameters (D). The improper input parameters can include one or more forcing functions that may be applied to the circuit after it is deployed to get the circuit to operate in the field. The forcing function can be determined from a spec sheet, such as can include a voltage, current, or frequency, that a corresponding component is not designed to handle so as to be outside the tolerances of the component. The improper input parameters can include an electrical and/or frequency based signal leakage.

The method 100 as illustrated includes mapping improper output parameters of the circuit at operation 108. The improper output parameters of the circuit are referred to herein as Z. The improper output parameters Z comprise a plurality of individual improper output parameters $Z_1, Z_2 \ldots Z_N$. Each of the improper output parameters can be determined by experimentation, mining a datasheet corresponding to the component, and/or predicting an improper output parameter. A predicted improper parameter can be determined by performing a simulation using electrical or electronic circuit simulation software and/or hardware and using an output of the simulation as a predicted improper output. Additionally or alternatively, the predicted improper output parameter can be determined using circuit theory (e.g., Kirchhoff's rule, Ohm's law, small and/or large signal analysis, semiconductor device theory, Coulomb's law, etc.). Additionally or alternatively, an improper output parameter can be gleaned from a data sheet regarding the component or by experimentation in which improper input parameters are applied to a component and the output of that component or another component is measured while the improper input is being applied. In one or more embodiments, an improper output parameter can be predicted using a Kalman filter. If the measured or predicted output parameter is not in the proper outputs (Y), then the measured parameter can be added to the improper output parameters (Z). The improper output parameters (Z) can include one or more of a power consumption of component, a voltage, current, power or frequency (e.g., a range of voltages, currents, power, or frequencies) on an input or output node of a component, a heat profile of a component while in normal operation, a signal to noise ratio (SNR) of the component, and an RF pattern, such as an RF pattern of a signal created by the component or an RF interference pattern of the component. The improper output parameters can include an electrical and/or frequency based signal leakage.

By using data sheet mining and prediction techniques for determining X, Y, and Z, the total time and labor to determine these data sets can be reduced as compared to determining each data set in the laboratory using experimentation for each individual component of each individual circuit.

The method 100 as illustrated includes receiving actual input parameters ($X_a$) and actual output parameters ($Y_a$) of the circuit at operation 110. The actual input and output parameters can be measured and collected by one or more components of the circuit. The actual input parameters and actual output parameters of the circuit are referred to herein as $X_a$ and $Y_a$, respectively. The actual input parameters $X_a$ comprise a plurality of individual actual input parameters $X_{a1}, X_{a2} \ldots X_{aN}$. The actual output parameters $Y_a$ comprise a plurality of individual actual output parameters $Y_{a1}, Y_{a2} \ldots Y_{aN}$. Each of the actual performance parameters can be determined by probing a circuit, monitoring a voltage and/or current on a trace or pad corresponding to a node of a component, sensing a temperature at or near a component, detecting an RF radiation pattern from a component, and/or using determined data to calculate an actual parameter, such as SNR, power, or other actual parameter. Note that while X, Y, D, Z, $X_a$, and $Y_a$ are conveniently defined to include the same number of elements in each set (N), this is typically not the case. Typically X, Y, D, Z, $X_a$, and $Y_a$ include different numbers of parameters. The actual input and/or output parameters can include an electrical and/or frequency based signal leakage.

Figure 2:
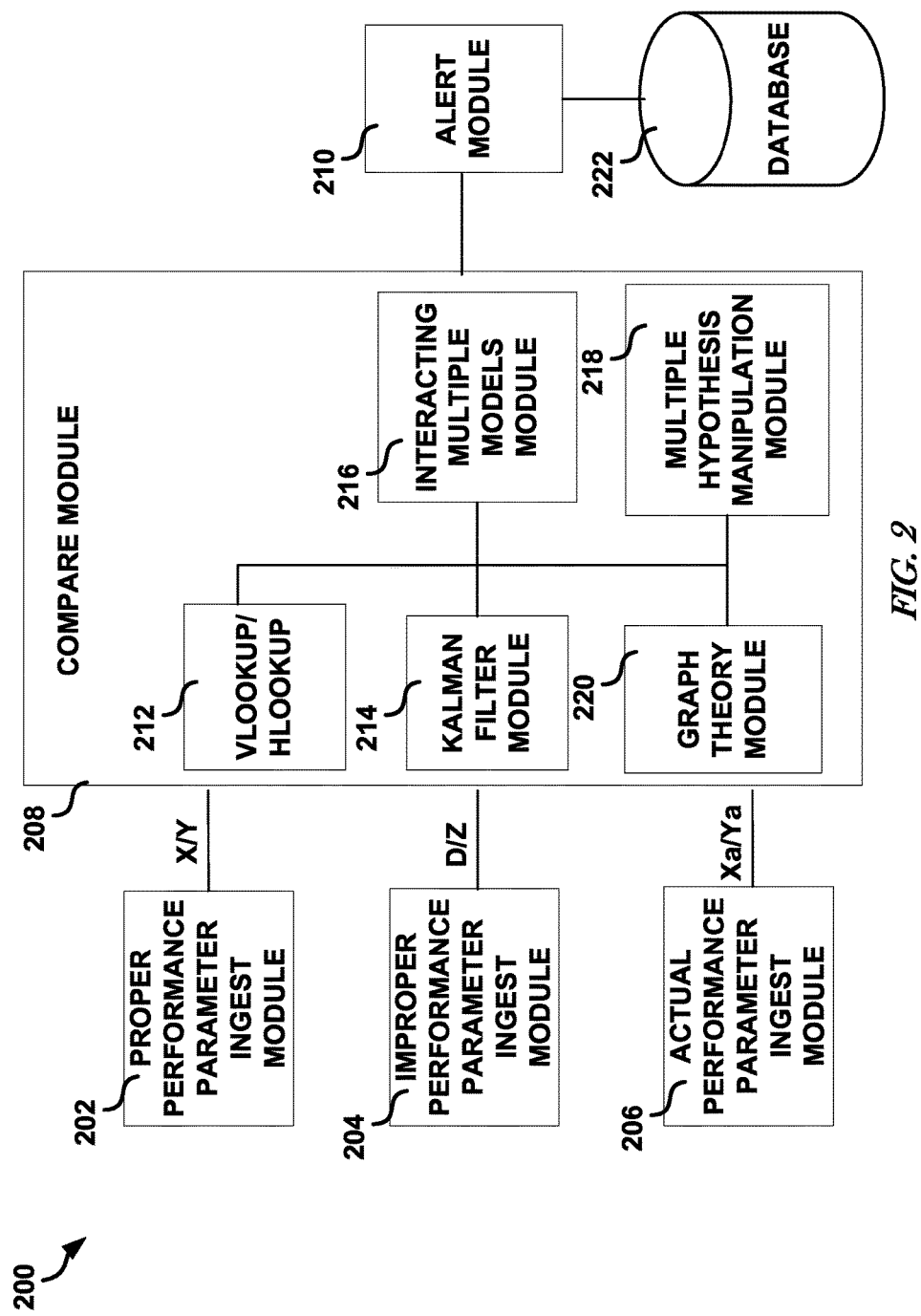
FIG. 2 illustrates, by way of example, an embodiment of a system for determining if operation of a circuit is compromised.

In one or more embodiments, circuit probes can be set up to provide data to a machine external to the circuit being monitored and the machine can determine if the circuit is more likely to be operating properly or improperly (more discussion regarding proper and improper operation of the circuit is provided with regard to FIG. 2). In one or more embodiments, a processor of the circuit can include parameters (e.g., signals that can be used to determine actual parameters ($X_a/Y_a$)) to be monitored as inputs and outputs and the processor can perform an analysis as to whether the circuit (e.g., including the processor) is operating properly or improperly. Such an embodiments are commonly referred to as a built-in-test. The signals to be monitored can include inputs and outputs from one or more traces, (e.g., DPA traces), pads, vias, or other component nodes, and/or signals from one or more sensors, such as an ohm meter, a current meter, a voltage meter, a temperature probe, a microphone, chemical sensor, magnetometer, accelerometer, gyroscope, capacitance sensor, position sensor, optical sensor, pressure sensor, force sensor, proximity sensor, or other sensor. If the processor is a part of the circuit and is monitoring the circuit, the circuit includes what is called a built in test (BIT) capability. In one or more embodiments, such a processor and/or sensors can be added to a circuit to provide the BIT capability.

The method 100 as illustrated includes comparing actual input and actual output parameters to proper and improper input and output parameters at operation 112. The comparison can include a Vlookup (vertical lookup) or HLookup (horizontal lookup) table function which compares a value in one column or row, and finds its corresponding value within a data set. When performing a Vlookup, each match returns the corresponding value in the same row in the next column. Hlookup is similar to Vlookup except each match returns the corresponding value in the same column in the next row. Using Vlookup/Hlookup, the actual values being produced by the circuit ($X_a$ and $Y_a$) are compared to the known good parameter values (X and Y) looking for a match in the data set, which would pass with no action, and (e.g., simultaneously) the actual values can be compared to known bad values (Z). If the actual parameter values ($X_a$ and $Y_a$) more closely match Z then X and Y, an alarm can be provided and/or a course of action can be determined and implemented. The Vlookup/Hlookup table(s) can include alarm tolerance definitions and/or instructions to be followed in response to determining an alarm tolerance has been breached. For example, a component can include a zero tolerance for a first CONOPS and an infinite tolerance for improper behavior for a second CONOPS. If the component is determined to be behaving improperly in the first CONOPS the instructions can be followed, such as by providing instruction signals to the circuit or personnel. If the component is determined to be behaving improperly in the second CONOPS, no action is performed.

The comparison can include Kalman filtering one or more of the proper input parameters (X), proper output parameters (Y), improper input and output parameters (D and Z), actual input parameters ($X_a$), and actual output parameters ($Y_a$). Kalman filtering uses measurements over time that can produce probabilistic estimates of unknown parameters. A Kalman filter produces an estimate of the current state variables and corresponding uncertainties. Then, in response to receiving a next set of measurements, the estimates are updated using a weighted average, with a higher weight afforded to measurements with greater accuracy. The weights are calculated using a covariance of the prediction of the measurement state. The Kalman filter can estimate the current state of the actual input and output parameters ($X_a$ and $Y_a$), predict other proper input parameters that can be added to the set of proper input parameters, X, predict other proper output parameters that can be added to the set of proper output parameters, Y, predict other improper input parameters that can be added to the set of improper input parameters, D, and/or predict other improper output parameters that can be added to the set of improper output parameters, Z. A data set produced using Kalman filtering contains more information than data sets obtained using point specific manual laboratory testing.

The comparison can include using interacting multiple models (IMM) on either the output of the Kalman Filter or X, Y, D, Z, $X_a$, and/or $Y_a$. The IMM evaluates whether the actual performance parameters ($X_a/Y_a$) more likely match the proper performance parameters (X/Y) or more likely match the improper performance parameters (D/Z). Using IMM, no exact match is required between $X_a/Y_a$ and X/Y or D/Z. Using IMM, it can be determined whether $X_a/Y_a$ are likely a hybrid of one or more improper input or output parameters, D/Z. For example, it can be determined if $X_a/Y_a$ are likely to match a mathematical combination of the individual Z or D parameters. Thus, IMM can be used to determine if the behavior is improper even if the improper parameter is not currently a member of the parameters D and/or Z, but is some mathematical combination of the set D and/or Z. IMM generally includes using multiple Kalman filters, where each Kalman filter uses a different model for proper and/or improper circuit parameters. The IMM generally forms a weighted sum of the output of each of the Kalman filters (weighted based on the covariance such that a smaller covariance receives a higher weight). The output of the Kalman filters' state estimation combined with the covariance limit can then be increased (broadened) or decreased (narrowed) to affect the alarm tolerance.

The comparison can include using multiple hypothesis manipulation (MHM) on either the output of the Kalman filter, the output of the IMM, and/or X, Y, D, Z, $X_a$, and/or $Y_a$. Using MHM, combinations of input parameters are evaluated to determine which combination of input parameters is most likely to match the actual output parameters $Y_a$. Using MHM, a cause of an improper input or output parameter can be determined probabilistically. MHM includes calculating (re-calculating) probabilities obtained from a statistical test that is repeated. There are many methods of performing MHM and one may generally work better than another method depending on the application and the variances (e.g., covariances of the groups being compared using MHM). For example, Tukey-Kramer method works well in situations where the variances of the two groups are generally similar or the same. Other methods can be used, such as Scheffe's method, Rodger's method, Duncan's new multiple range test, Nemenyi test, Bonferroni-Dunn test, Newman-Keuls post hoc analysis, and Dunnett's test.

The comparison can include using graph theory on either the output of the Kalman filter, the output of the IMM, the output of the MHM, and/or X, Y, D, Z, $X_a$, and/or $Y_a$. Using graph theory a pattern match score (a score indicative of whether $X_d/Y_a$ more closely match X/Y or D/Z) can be evaluated. Additionally or alternatively, graph theory can be used to monitor the progression of the parameters X, Y, D, Z, $X_a$, and/or $Y_a$. For example, a graph theoretic technique of finding the n-hop nearest neighbors can be used to score a match between the predicted estimate from the Kalman filter and the states from the proper and improper outputs Y and/or Z. In some cases, the greater the number of hops means a lower score. Such a score could be calculated using a variety of scoring mechanisms, including the chi-square, maximum likelihood, Raleigh distribution or other methods combined with the results from the n-hop nearest neighbor technique. The use of other specific graph theoretic techniques will depend on the nature of each input and output parameter and can be chosen for each input and output parameter pair. The benefits of using graph theoretic techniques allow for a more complex multi-dimensional (multi-parameter) scoring mechanism for use in evaluating the state estimation and prediction, such as is determined using Kalman filter, IMM, MHM, and/or X, Y, D, Z, $X_a$, and/or $Y_a$. Use of graph theoretic techniques is predicated on the definition of the graph nodes and edges based on the behavior and interrelationships of the input and output parameters.

The method 100 as illustrated includes providing an alert to personnel and/or a processor of the circuit in response to determining that the circuit is behaving improperly at operation 114. The alert can include one or more signals indicating a component that is determined to be behaving improperly, such as can be determined by the comparison. This comparison can be performed nearly instantaneously due to the predetermined data maps X, Y, D, and Z. It can also be done "on board" the component processer without need for laboratory or manual manipulation. A user can define tamper tolerance levels (e.g., any source of abnormal performance, including component failure, accidental or malicious software or firmware errors, etc.) for the circuit and/or one or more components of the circuit. The tamper tolerance levels indicate what level of tampering is acceptable for a given component. The tamper tolerance levels can be set as a function of one or more signal values, sensor values, and/or component criticality to the CONOPS. For example, a user can define that a processor has no tolerance for tampering while a capacitor, resistor, transistor, sensor, or other component can be tampered with without compromising the overall CONOPS of the circuit and/or component. In such a situation, if it is determined that the transistor is likely behaving improperly, an alert may not be sent, while if it is determined that the processor is likely behaving improperly, an alert can be set regardless of how minor or major the change in behavior.

Likewise, the alarm decision module can operate with a set of tightened tolerances during critical operations in which even a non-critical component failure, such as a resistor failure, may be flagged during non-critical operations. Typically, such a component has larger tolerances than a critical component. In other scenarios the criticality levels may be reversed, where the tolerance set into the alarm decision module instruction set is broadened, whereby the tolerance set for alarm trip may be opened to near infinity, even for a critical component such as the processor, to allow for continued system operation, even in a degraded or compromised state during critical CONOPS. This scenario is sometimes referred to as "fighting hurt".

The method 100 as illustrated includes altering the circuit behavior at operation 116. One or more signals can be provided to the circuit, where the one or more signals configure the circuit to operate in a different manner. The altered behavior can be chosen based on the type of failure, the CONOPS, and the user defined tamper tolerance level(s). For example, the alert can cause the circuit to shut down, such as if the circuit or component is determined to not be/include a mission critical component that is necessary for performance of the CONOPS. In another example, the alert can do nothing to the operation of the circuit and allow the circuit to continue operating in its degraded (improper) state. In another example, the alert can cause the circuit to provide decoy signals that spoof continued operation of the circuit with altered signals, such as to provide bad data to an entity that tampered with the circuit. In another example, the alert can cause the circuit/component to obfuscate actual operation of the circuit by continuing operation that includes hidden embedded signals.

As used herein a parameter defines a quality of a signal or component (e.g., a voltage value or magnitude, current value or magnitude, resistance, capacitance, heat profile, inductance, a frequency, or a combination thereof, such as a power) before or after performing one or more mathematical operations on the quality. A proper performance parameter is a parameter that is observed or predicted to be present when the circuit is operating in accord with the current CONOPS and the normal operating ranges of the components of the circuit. An improper performance parameter is a parameter that is observed or predicted to be present when the circuit is not operating in accord with the current CONOPS and/or the normal operating ranges of the components of the circuit and the parameter is not a member of a set of proper performance parameters. A behavior is a response to a parameter being applied to a component and a model is a combination of behaviors in response to a plurality of parameters. Note that the parameters X, Y, D, and Z can include parameters and/or behaviors. A behavior is also a quality of a signal before or after performing one or more mathematical operations on the quality.

FIG. 2 illustrates, by way of example, an embodiment of a system 200 for determining if a circuit has been compromised. The system 200 as illustrated includes a proper performance parameter ingest module 202, an improper performance parameter ingest module 204, an actual performance parameter ingest module 206, a compare module 208, and an alert module 210. As illustrated the comparison module 208 includes A Vlookup module 212, a Kalman filter module 214, an IMM module 216, a multiple hypothesis manipulation module 218, a graph theory module 220, and a database 222.

In one or more embodiments, the proper performance parameter ingest module 202 automatically determines at least a portion of X and/or Y. Automatically determining X and Y can include data mining of one or more component data sheets and recording proper operation ranges for the component and/or logging parameters determined through circuit simulation. In one or more embodiments, the proper performance parameter ingest module 202 provides a user the ability to manually input at least a portion of X and/or Y. The module 202 can provide signals to a display through which a user can enter X and/or Y. The module 202 can receive signals from the display corresponding to proper performance parameters. The module 202 is used to implement the operations 102 and 104 of the method 100.

In one or more embodiments, the improper performance parameter ingest module 204 automatically determines at least a portion of D and/or Z. Automatically determining D and/or Z can include mining one or more component data sheets and recording improper operating ranges for the component and/or logging parameters determined through circuit simulation to be improper. In one or more embodiments, the improper performance parameter ingest module 204 provides a user the ability to manually input at least a portion of D and/or Z. The module 204 can provide signals to a display through which a user can enter D and/or Z. The module 204 can receive signals from the display corresponding to proper performance parameters. The module 202 is used to implement the operations 106 and 108 of the method 100.

In one or more embodiments, the actual performance parameter ingest module 206 automatically receives and/or automatically determines at least a portion of $X_a$ and/or $Y_a$. The actual performance parameters can be determined by self-propagating autonomous feedback by component, sensor(s) or other components in the circuit, such as an analog to digital converter. In one or more embodiments an actual performance parameter can be determined by a component external to the circuit, such as a laser range or temperature sensor. Automatically determining $X_a$ and $Y_a$ can include receiving data, such as from a sensor, or other component, such as an analog to digital converter, and performing one or more operations (e.g., mathematical operations) on the data to determine the one or more actual performance parameters $X_a$ and/or $Y_a$. In one or more embodiments, the actual performance parameter ingest module 206 provides a user the ability to manually input at least a portion of $X_a$ and/or $Y_a$. The module 206 can provide signals to a display through which a user can enter $X_a$ and/or $Y_a$. The module 206 can receive signals from the display corresponding to actual performance parameters. The module 206 is used to implement the operation 110 of the method 100.

The comparison module 208 can include one or more of the Vlookup module 212, Kalman filter module 214, the interacting multiple models module 216, the multiple hypothesis manipulation module 218, and the graph theory module 220. The Kalman filter module 214 implements a Kalman filter on one or more of the parameters X, Y, D, Z, $X_a$, and $Y_a$. The Kalman filter module 214 can perform at least a portion of the operation 112 of the method 100. The interacting multiple models module 216 determines whether the actual performance parameters ($X_a/Y_a$) more likely match the proper performance parameters (X/Y) or more likely match the improper performance parameters (D/Z), such as can be filtered by the Kalman filter module 214 prior to the determination. The interacting multiple models module 216 can perform at least a portion of the operation 112 of the method 100.

The multiple hypothesis manipulation module 218 evaluates combinations of input parameters to determine which combination of input parameters is most likely to match the actual output parameters $Y_a$. The multiple hypothesis manipulation module 218 can perform at least a portion of the operation 112 of the method 100. The graph theory module 220 assists in the scoring and evaluation of the match between input and output parameters. The graph theory module 220 implements one or more graph theoretic techniques to perform the scoring and evaluation.

The alert module 210 receives outputs from the comparison module 208 and provides one or more communications or control signals to the circuit or personnel. A communication to the circuit can include one or more commands, voltages, signals, and other machine language instruction types. A communication to personnel can include an email, text message, a prompt on a display, an audio communication, or other communication. The communication can include an indication of the circuit that has likely been compromised, one or more components of the circuit that caused the circuit to be compromised, a CONOPS associated with the circuit, and/or other information that can be relevant to informing personnel of the severity of the compromise or failure and other information surrounding the compromise or failure. In one or more embodiments, the alert module 210 can implement a user interface that can presented to personnel through a display. The personnel can input data through the user interface that causes the alert module 210 to provide one or more control signals to the circuit. The control signals can cause the circuit to alter its operations, such as by halting operations altogether, providing decoy signals, and/or operating with an obfuscated signaling protocol. In one or more embodiments, the personnel can indicate that the circuit is to continue operating in the compromised state. In one or more embodiments, the alert module 210 can determine a cause of action to be performed automatically, such as in response to receiving one or more signals indicating that the circuit has likely been compromised and/or what components of the circuit are likely the cause of the compromise. Using the received information the alert module 210 can determine if an action is to be taken. The alert module 210 can query a database 222 or look up data in a local memory (not shown in FIG. 2) to determine what action is to be taken.

Actions to be taken can include feedback to other modules to increase or decrease analysis rate (rate at which the modules perform their portion of the analysis of whether one or more components of the circuit have been compromised), various performance parameters, alarm tolerances and so on. Current CONOPS conditions can be used to influence these actions and increase or decrease their magnitude from zero to infinity over some baseline value. For example, certain component compromises may indicate eventual system failure, such as when a circuit compromise indicates eventual overheating of a critical component. In this case the alert module 210 may recommend or command the circuit to accelerate its activities so as to execute CONOPS prior to total circuit failure. In a different CONOPS scenario of a less critical nature the alert module 210 may recommend or command the circuit to stop, thereby preserving any remaining capability to operate until CONOPS become sufficiently important again, and also allowing the component temperature to be reduced. The action to be taken can include providing an alert to proper personnel and/or providing one or more control signals to the circuit that cause the circuit to alter its current state of operations, such as by using decoy or obfuscated signaling. These recommendations to humans and or commands to the machine can be located within a logic-bearing component of the alert module 210, and can take the form of a separate Vlookup (or Hlookup) table or other if-this, then-that decision framework components.

The database 222 or the local memory includes data stored thereon including data indexed according to circuit. The data indicates operations to be performed in response to determining a circuit or a component of a circuit has been compromised. In one or more embodiments, the data indicates only the components that, when compromised, require some sort of action from the alert module 210. Thus, if the component is not listed in the data, the alert module 210 allows the circuit to continue operating in its compromised state. If the component is listed in the data, the alert module 210 determines whether to alert personnel and/or which control signals to provide to the circuit to alter the operation of the circuit. This data can be indexed according to component or other indexing scheme.

Figure 3:
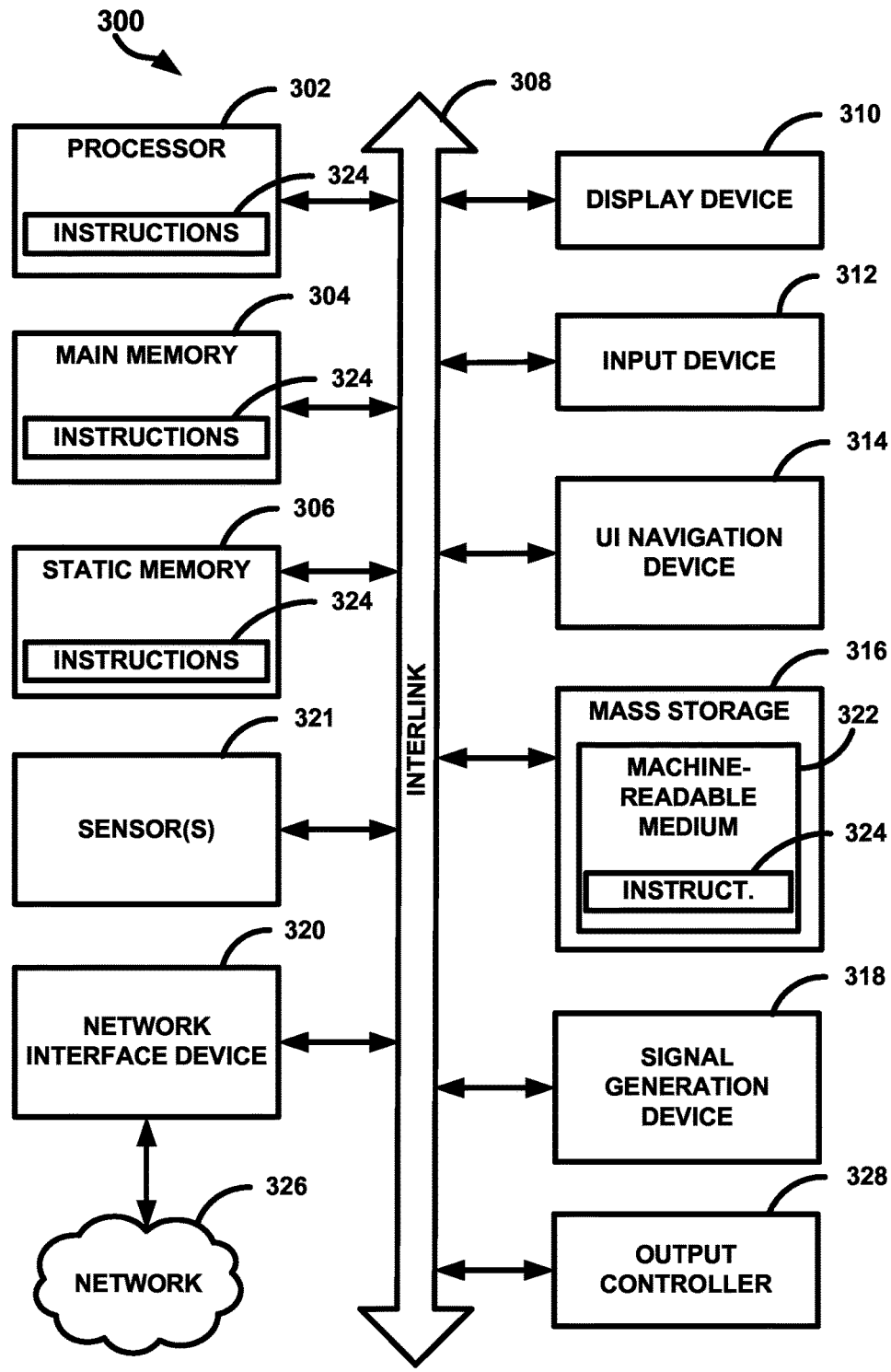
FIG. 3 illustrates, by way of example, a block diagram of an embodiment of a machine on which one or more of the methods as discussed herein can be implemented.

FIG. 3 illustrates, by way of example, a block diagram of an embodiment of a machine 300 on which one or more of the methods as discussed herein can be implemented. The machine 300 can include a computing device instantiated as a compute device or server. The machine 300 may be employed to host or be integral to hardware, software, and/or firmware that provides a user (e.g., in real time, near real time, or on demand) with an indication of whether a report was previously submitted regarding a same or similar issue that is being or has been reported by the user. One or more of the proper performance parameter ingest module 202, improper performance parameter ingest module 204, actual performance parameter ingest module 206, comparison module 208, Kalman filter module 214, interacting multiple models module 216, multiple hypothesis manipulation module 218, graph theory module 220, and the alert module 210 can include one or more of the items of the machine 300. In one or more embodiments, proper performance parameter ingest module 202, improper performance parameter ingest module 204, actual performance parameter ingest module 206, comparison module 208, Kalman filter module 214, interacting multiple models module 216, multiple hypothesis manipulation module 218, graph theory module 220, and the alert module 210 can be implemented by the machine 300. In alternative embodiments, the machine 300 operates as a standalone device or may be connected (e.g., networked) to other machines. In a networked deployment, the machine 300 may operate in the capacity to monitor multiple components and circuits and may operate as a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 300 includes a processor 302 (e.g., a central processing unit (CPU), a graphics processing unit (GPU) or both), a main memory 304 and a static memory 306, which communicate with each other via a bus 308. The machine 300 may further include a video display unit 310 (e.g., a liquid crystal display (LCD) or a cathode ray tube (CRT)). The machine 300 may include an alphanumeric input device 312 (e.g., a keyboard), a user interface (UI) navigation device 314 (e.g., a mouse), a disk drive unit 316, a signal generation device 318 (e.g., a speaker) and a network interface device 320.

The memory 304 or 306 are examples of a storage device that can include instructions stored thereon that are executed by a machine, such as a processor or other processing circuitry, and cause the machine to perform operations. The storage device can be programmed and maintained prior to its inclusion in a BIT system. The instructions and other information can be encrypted or otherwise protected by one or more security measures, such as to help protect the operational boundaries and other data stored thereon.

The disk drive unit 316 includes a machine-readable medium 322 on which is stored one or more sets of instructions and data structures (e.g., software) 324 embodying or utilized by any one or more of the methodologies or functions described herein. The instructions 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 324 may further be transmitted or received over a communications network 326 using a transmission medium. The instructions 324 may be transmitted using the network interface device 320 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules described herein include the proper performance parameter ingest module 202, the improper performance parameter ingest module 204, the actual performance parameter ingest module 206, the compare module 208, the alert module 210, the Vlookup/Hlookup module 212, the Kalman filter module 214, the IMM module 216, the MHM module 218, and the graph theory module 220. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

In one embodiment, the modules are written in a computer-programming and/or scripting language. Examples of such languages include, but are not limited to, C, C++, C#, Java, JavaScript, Perl, Python, or any other computer programming and/or scripting language now known or later developed.

Similarly, the methods described herein may be at least partially processor-implemented, with a particular processor or processors being an example of hardware. For example, at least some of the operations of a method may be performed by one or more processors or processor-implemented modules.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

A circuit that has failed or otherwise become inoperable will generally not be able to transmit data or other signals. In response to a detected power level of the circuit dropping to a threshold power (e.g., a power under which a signal can no longer be transmitted to a receiving circuit) a failure signal can be transmitted by the circuit. Triangulation based on the received failure signal can be used to determine which circuit has failed. The CONOPS for each circuit can be updated with the understanding that the circuit has failed, such as to help carry out the operations performed by the failed component or to just move on with the mission without the intelligence provided by the failed circuit.

In an example, the hardware can include configurable execution units (e.g., transistors, logic gates (e.g., combinational and/or state logic), circuits, etc.) and a machine readable medium containing instructions, where the instructions configure the execution units to carry out a specific operation when in operation. The configuring can occur under the direction of the executions units or a loading mechanism. Accordingly, the execution units (e.g., processing circuitry, such as can include one or more hardware processors, transistors, resistors, capacitors, inductors, state machines or other logic gates, multiplexers, radios, sensors or other electrical or electronic components) can be communicatively coupled to the machine readable medium when the device is operating. In this example, the execution units can be a user (e.g., personnel) of more than one module. For example, under operation, the execution units can be configured by a first set of instructions to implement a first module at one point in time and reconfigured by a second set of instructions to implement a second module. The system 200 as illustrated includes a plurality of separate modules. The modules can be implemented with the division of operations as explained herein or the division of operations can be different such that a single module implements one or more of the operations of two or more of the modules or multiple modules implement the operations of one of the modules.

EXAMPLES AND ADDITIONAL NOTES

Example 1 can include or use subject matter (such as an apparatus, a method, a means for performing operations, or a machine readable memory including instructions that, when performed by the machine, can cause the machine to perform operations), such as can include or use one or more memories, processing circuitry coupled to the one or more memories to execute instructions stored on the one or more memories so as to implement modules including a proper performance ingest module to receive proper performance values of components of a circuit based on two or more of a differential power analysis, a specification sheet for the circuit, signal to noise ratio, radio frequency interference pattern, power consumption, heat produced, and a measurement of electrical potential or current values at electrical contacts of the circuit, the proper performance values include a proper input characteristic (X) and a proper output characteristic (Y), an improper performance module to receive improper performance values of the circuit, the improper performance values including improper input values (D) and improper output values (Z), wherein the improper input values (D) include one or more of an improper electromagnetic radiation, improper noise, improper forcing function, obfuscated input, and malicious code and the improper output values (Z) include an output of the circuit in response to being stimulated by the improper input value, a compare module to compare actual circuit input characteristics ($X_a$) and actual circuit output characteristics ($Y_a$) to X, Y, D, and Z to determine if the circuit is more likely operating properly or more likely operating improperly, and an alert module to, in response to determining the circuit is operating improperly, provide an alert to personnel indicating that the circuit is operating improperly or providing one or more signals to the circuit that cause the circuit to alter its current operation.

Example 2 can include or use, or can optionally be combined with the subject matter of Example 1, to include or use, wherein the compare module further comprises a Kalman filter module to estimate the state of the actual circuit input characteristics ($X_a$) based on a limited, incomplete dataset before comparing to the proper performance values and the improper performance values.

Example 3 can include or use, or can optionally be combined with the subject matter of Example 2, to include or use, wherein the Kalman filter module further predicts other proper performance values and improper performance values based on the proper performance values (X and Y), improper performance values (D and Z), and actual performance parameters ($X_a$ and $Y_a$).

Example 4 can include or use, or can optionally be combined with the subject matter of at least one of Examples 2-3, to include or use, wherein the compare module further comprises an interacting multiple models module to compare $X_a$ and $Y_a$ to X, Y, D, and Z and evaluate, using interacting multiple models, whether $Y_a$ more closely matches Y or Z.

Example 5 can include or use, or can optionally be combined with the subject matter of at least one of Examples 2-4, to include or use, wherein $Z=\{Z_1, Z_2, \ldots Z_N\}$, where each $Z_i$ is an individual set of improper performance values of a number of improper performance values (Z), and wherein the compare module further includes an interacting multiple models module to evaluate, using interacting multiple models, whether $Y_a$ more closely matches Y or a hybrid pattern that is a mathematical combination of two or more of $\{Z_1, Z_2, \ldots Z_N\}$.

Example 6 can include or use, or can optionally be combined with the subject matter of Example 5, to include or use, wherein the compare module further comprises a multiple hypothesis manipulation module to determine a set of input characteristics that most likely caused improper performance values.

Example 7 can include or use, or can optionally be combined with the subject matter of Example 6, to include or use, wherein the alert module is to include the set of input characteristics determined by the multiple hypothesis manipulation module in the alert to personnel or the circuit including a location of a component of the components determined to be operating improperly based on the comparison by the interacting multiple models module.

Example 8 can include or use, or can optionally be combined with the subject matter of at least one of Examples 6-7, to include or use, wherein the compare module includes a graph theory module to evaluate, using graph theory, pattern match scores between (1) $Y_a$ and Y and (2) $Y_a$ and Z to determine if the circuit is operating improperly.

Example 9 can include or use, or can optionally be combined with the subject matter of Example 8, to include or use a trace determination module to determine, using X, Y, D, Z, $X_a$, and $Y_a$, a trace at which the circuit is behaving improperly and wherein the alert module is to provide an indication of the trace or a component of the circuit connected to the trace, using a circuit diagram of the circuit, in the alert to the personnel or the circuit set.

Example 10 can include or use, or can optionally be combined with the subject matter of Example 9, to include or use, wherein the alert module is to provide a signal to the processing circuitry that causes the processing circuitry to continue operating with decoy signals that include signals that are asserted by the processor to spoof that the circuit is continuing normal operation or continue operation with obfuscated signals that include hidden signals embedded in normal operation signals.

Example 11 can include or use subject matter (such as an apparatus, a method, a means for performing operations, or a machine readable memory including instructions that, when performed by the machine, can cause the machine to perform operations), such as can include or use determining proper performance values of a circuit based on two or more of a differential power analysis, a specification sheet for the circuit, signal to noise ratio, radio frequency interference pattern, heat produced and a measurement of electrical potential or current values at electrical contacts of the circuit, the proper performance values include a proper input characteristic (X) and a proper output characteristic (Y), determining improper performance values of the circuit, the improper performance values including improper input values and improper output values (Z), wherein the improper input values include one or more of an improper power consumption, improper electromagnetic radiation, improper noise, improper forcing function, obfuscated input, and malicious code and the improper output values include an output of the circuit in response to being stimulated by the improper input value, comparing actual circuit input characteristics (Xa) and actual circuit output characteristics (Ya) to the proper performance values and the improper performance values to determine if the circuit is more likely operating properly or more likely operating improperly, and in response to determining the circuit is operating improperly, providing an alert to personnel indicating that the circuit is operating improperly or providing one or more signals to the circuit that cause the circuit to alter its current behavior.

Example 12 can include or use, or can optionally be combined with the subject matter of Example 11, to include or use, estimating the state of the actual circuit input characteristics (Xa) using Kalman filtering before comparing to the proper performance values and the improper performance values.

Example 13 can include or use, or can optionally be combined with the subject matter of Example 12, to include or use, wherein comparing Xa and Ya to X, Y, and Z includes evaluating, using interacting multiple models, whether Ya more closely matches Y or Z.

Example 14 can include or use, or can optionally be combined with the subject matter of at least one of Examples 12-13, to include or use, wherein $Z=\{Z_1, Z_2, \ldots Z_N\}$ and wherein comparing Xa and Ya to X, Y, and Z includes evaluating, using interacting multiple models, whether Ya more closely matches Y or a hybrid pattern that is a combination of two or more of $\{Z_1, Z_2, \ldots Z_N\}$.

Example 15 can include or use, or can optionally be combined with the subject matter of Example 14, to include or use using multiple hypothesis manipulation to determine a set of input characteristics that most likely caused improper performance values, and using graph theory to evaluate a pattern match score between Ya, Y, and Z to determine if the circuit is operating improperly.

Example 16 can include or use, or can optionally be combined with the subject matter of at least one of Examples 11-14, to include or use determining based on at least one of a type of improper behavior, the component connected to the trace, and concept of operations (CONOPS) an alarm tolerance from zero to infinity that indicates a criticality of the component to the CONOPS and which improper behaviors will cause at least one of provide an alert to personnel indicating that the circuit is operating improperly and provide one or more signals to the circuit that cause the circuit to alter its current operation.

Example 17 can include or use, or can optionally be combined with the subject matter of Example 16, to include or use in response to determining that the improper behavior exceeds the tolerance, providing one or more instruction signals to the circuit or personnel based on at least one of the type of improper behavior, the component connected to the trace, and the CONOPS, wherein the instruction signals include text instructions or machine commands.

Example 18 can include or use, or can optionally be combined with the subject matter of Example 17, to include or use providing instruction signals to the circuit that causes the circuit to continue operating with decoy signals that include signals that are asserted by the processor to spoof that the circuit is continuing normal operation or continue operation with obfuscated signals that include hidden signals embedded in normal operation signals.

Example 19 can include or use subject matter (such as an apparatus, a method, a means for performing operations, or a machine readable memory including instructions that, when performed by the machine, can cause the machine to perform operations), such as can include or use a non-transitory, machine-readable storage device including instructions stored thereon which, when executed by a machine, cause the machine to perform operations for determining and indicating whether a circuit is performing properly, the operations comprising at least one of Examples 11-18.

Example 20 can include or use, or can optionally be combined with the subject matter of at least one of Examples 1-10, to include or use a vlookup/hlookup module to determine, based on at least one of a type of improper behavior, the component connected to the trace, and concept of operations (CONOPS), an alarm tolerance from zero to infinity that indicates a criticality of the component to the CONOPS and which improper behavior will cause the alert module to perform at least one of provide an alert to personnel indicating that the circuit is operating improperly and provide one or more signals to the circuit that cause the circuit to alter its current operation.

Example 21 can include or use, or can optionally be combined with the subject matter of Example 20, to include or use in response to the alert module determining that the improper behavior exceeds the tolerance, the alert module is to provide one or more instruction signals to the circuit or personnel based on at least one of the type of improper behavior, the component connected to the trace, and the CONOPS, wherein the instruction signals include text instructions or machine commands determined using the vlookup/hlookup module.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for determining and indicating whether a circuit is performing properly, the system comprising:
   one or more memories;
   processing circuitry coupled to the one or more memories to execute instructions stored on the one or more memories so as to implement modules including:
   a proper performance ingest module to receive proper performance values of components of a circuit based on two or more of a differential power analysis, a specification sheet for the circuit, signal to noise ratio, radio frequency interference pattern, power consumption, heat produced, a measurement of electrical potential, or current values at electrical contacts of the circuit, the proper performance values include a proper input characteristic (X) and a proper output characteristic (Y);
   an improper performance module to receive improper performance values of the circuit, the improper performance values including improper input values (D) and improper output values (Z), wherein the improper input values (D) include one or more of an improper electromagnetic radiation, improper noise, improper forcing function, obfuscated input, or malicious code and the improper output values (Z) include an output of the circuit in response to being stimulated by the improper input value;

a compare module to compare actual circuit input characteristics ($X_a$) and actual circuit output characteristics ($Y_a$) to X, Y D, and Z to determine if the circuit is more likely operating properly or more likely operating improperly, the compare module including a Kalman filter module to estimate the state of the actual circuit input characteristics ($X_a$) based on a limited, incomplete dataset before comparing to the proper performance values and the improper performance values and an interacting multiple models module to compare $X_a$ and $Y_a$ to X, Y, D, and Z and evaluate, using interacting multiple models, whether $Y_a$ more closely matches Y or Z; and an alert module to, in response to determining the circuit is operating improperly, provide an alert to personnel indicating that the circuit is operating improperly and a signal to the processing circuitry that causes the processing circuitry to continue operation with obfuscated signals that include hidden signals embedded in normal operation signals.

2. The system of claim 1, wherein the Kalman filter module further predicts other proper performance values and improper performance values based on the proper performance values (X and Y), improper performance values (D and Z), and actual performance parameters ($X_a$ and $Y_a$).

3. The system of claim 1, wherein Z={$Z_1, Z_2, \ldots Z_N$}, where each $Z_i$ is an individual set of improper performance values of a number of improper performance values (Z), and wherein the compare module further includes an interacting multiple models module to evaluate, using interacting multiple models, whether $Y_a$ more closely matches Y or a hybrid pattern that is a mathematical combination of two or more of {$Z_1, Z_2, \ldots Z_N$}.

4. The system of claim 3, wherein the compare module further comprises a multiple hypothesis manipulation module to determine a set of input characteristics that most likely caused improper performance values.

5. The system of claim 4, wherein the alert module is to include the set of input characteristics determined by the multiple hypothesis manipulation module in the alert to personnel or the circuit including a location of a component of the components determined to be operating improperly based on the comparison by the interacting multiple models module.

6. The system of claim 4, wherein the compare module includes a graph theory module to evaluate, using graph theory, pattern match scores between (1) $Y_a$ and Y and (2) $Y_a$ and Z to determine if the circuit is operating improperly.

7. The system of claim 6, further comprising a trace determination module to determine, using X, Y, D, Z, $X_a$, and $Y_a$, a trace at which the circuit is behaving improperly and wherein the alert module is to provide an indication of the trace or a component of the circuit connected to the trace, using a circuit diagram of the circuit, in the alert to the personnel or the circuit set.

8. The system of claim 7, further comprising a vlookup/hlookup module to determine, based on at least one of a type of improper behavior, the component connected to the trace, and concept of operations (CONOPS), an alarm tolerance from zero to infinity that indicates a criticality of the component to the CONOPS and which improper behavior will cause the alert module to perform at least one of provide an alert to personnel indicating that the circuit is operating improperly and provide one or more signals to the circuit that cause the circuit to alter its current operation and wherein, in response to the alert module determining that the improper behavior exceeds the tolerance, the alert module is to provide one or more instruction signals to the circuit or personnel based on at least one of the type of improper behavior, the component connected to the trace, and the CONOPS, wherein the instruction signals include text instructions or machine commands determined using the vlookup/hlookup module.

9. A method for determining and indicating whether a circuit is performing properly, the method comprising:

determining proper performance values of a circuit based on two or more of a differential power analysis, a specification sheet for the circuit, signal to noise ratio, radio frequency interference pattern, heat produced, a measurement of electrical potential, or current values at electrical contacts of the circuit, the proper performance values include a proper input characteristic (X) and a proper output characteristic (Y);

determining improper performance values of the circuit, the improper performance values including improper input values and improper output values (Z), wherein the improper input values include one or more of an improper power consumption, improper electromagnetic radiation, improper noise, improper forcing function, obfuscated input, and malicious code and the improper output values include an output of the circuit in response to being stimulated by the improper input value;

estimating a state of actual circuit input characteristics (Xa) using Kalman filtering;

comparing the estimated state of actual circuit input characteristics (Xa) and actual circuit output characteristics (Ya) to the proper performance values and the improper performance values to determine if the circuit is more likely operating properly or more likely operating improperly_0 including evaluating, using interacting multiple models, whether Ya more closely matches Y or Z including evaluating using interacting multiple models, whether Ya more closely matches Y or a hybrid pattern that is a combination of two or more of {$Z_1, Z_2, \ldots Z_n$};

providing instruction signals to the circuit that causes the circuit to continue operating with obfuscated signals that include hidden signals embedded in normal operation signals; and in response to determining the circuit is operating improperly, providing an alert to personnel indicating that the circuit is operating improperly or providing one or more signals to the circuit that cause the circuit to alter its current behavior.

10. The method of claim 9, further comprising:
using multiple hypothesis manipulation to determine a set of input characteristics that most likely caused improper performance values; and
using graph theory to evaluate a pattern match score between Ya, Y and Z to determine if the circuit is operating improperly.

11. The method of claim 10, further comprising:
determining based on at least one of a type of improper behavior, the component connected to the trace, and concept of operations (CONOPS) an alarm tolerance from zero to infinity that indicates a criticality of the component to the CONOPS and which improper behaviors will cause at least one of provide an alert to personnel indicating that the circuit is operating improperly and provide one or more signals to the circuit that cause the circuit to alter its current operation; and in response to determining that the improper behavior exceeds the tolerance, providing one or more instruction signals to the circuit or personnel based on at least one of the type of improper behavior, the component connected to the trace, and the CONOPS, wherein the instruction signals include text instructions or machine commands.

12. A non-transitory, machine-readable storage device including instructions stored thereon which, when executed by a machine, cause the machine to perform operations for determining and indicating whether a circuit is performing properly, the operations comprising:

determining proper performance values of a circuit based on two or more of a differential power analysis, a specification sheet for the circuit, signal to noise ratio, radio frequency interference pattern, heat produced, a measurement of electrical potential, or current values at electrical contacts of the circuit, the proper performance values include a proper input characteristic (X) and a proper output characteristic (Y);

determining improper performance values of the circuit, the improper performance values including improper input values (D) and improper output values (Z), wherein the improper input values include one or more of an improper power consumption, improper electromagnetic radiation, improper noise, improper forcing function, obfuscated input, and malicious code or the improper output values include an output of the circuit in response to being stimulated by the improper input value;

estimating a state of actual circuit input characteristics (Xa using Kalman filtering;

comparing the estimated state of actual circuit input characteristics (Xa) and actual circuit output characteristics (Ya) to the proper performance values and the improper performance values to determine if the circuit is more likely operating properly or more likely operating improperly;

providing instruction signals to the circuit that causes the circuit to continue operating with obfuscated signals that include hidden signals embedded in normal operation signals; and in response to determining the circuit is operating improperly, providing an alert to personnel indicating that the circuit is operating improperly or providing one or more signals to the circuit that cause the circuit to alter its current behavior.

13. The storage device of claim 12, wherein the instructions for comparing Xa and Ya to X, Y, and Z include instructions which, when executed by the machine, cause the machine to perform operations including evaluating, using interacting multiple models, whether Ya more closely matches Y or Z.

14. The storage device of claim 12, wherein $Z=\{Z_1, Z_2, \ldots Z_N\}$ and wherein the instructions for comparing Xa and Ya to X, Y, and Z include instructions for evaluating, using interacting multiple models, whether Ya more closely matches Y or a hybrid pattern that is a combination of two or more of $\{Z_1, Z_2, \ldots Z_N\}$.

15. The method of claim 14 further comprising instructions stored thereon which, when executed by the machine, cause the machine to perform operations comprising:

using multiple hypothesis manipulation to determine a set of input characteristics that most likely caused improper performance values; and using graph theory to evaluate a pattern match score between Ya, Y, and Z to determine if the circuit is operating improperly.

\* \* \* \* \*